April 10, 1962 S. M. BAGNO ETAL 3,029,420

NETWORK FOR MONITORING ALARM SYSTEMS

Filed Feb. 25, 1957 2 Sheets-Sheet 1

INVENTORS
Samuel M. Bagno
Eli Levy
BY Ernest A. Joenen
ATTORNEY

INVENTORS
Samuel M. Bagno
Eli Levy
BY Ernest A. Joenen
ATTORNEY.

United States Patent Office 3,029,420

Patented Apr. 10, 1962

3,029,420

NETWORK FOR MONITORING ALARM SYSTEMS

Samuel M. Bagno, Belleville, and Eli Levy, Bloomfield, N.J., assignors to Walter Kidde & Company, Inc., Belleville, N.J., a corporation of New York Filed Feb. 25, 1957, Ser. No. 641,904
6 Claims. (Cl. 340—213)

The present invention relates to alarm systems for primarily protecting various enclosures against intrusion, the alarms of which are watched from a central station, and, more particularly, to a network for indicating tampering with the line from the location of the alarm to the central station in an attempt to render the system incapable of detecting an intruder.

Heretofore, alarm systems such as disclosed in United States Patent No. 2,656,645, for example, have been installed at the locations sought to be protected, and the alarm relays of these systems were connected by a line to alarm means located at a central station where the alarms means were watched. In the supervision of such systems, it has been discovered that attempts were made to tamper with the line before intruding on the premises sought to be protected so as to prevent an alarm from getting through to the central station without detection of such tampering. Since such tampering can defeat the very purpose of intruder alarm systems, it presents a serious problem.

This problem can be solved in a number of ways all varying in complexity, cost and fool-proofness.

Accordingly, an object of the present invention is to provide a network for monitoring such alarm systems which has maximum fool-proofness and simplicity of design at a low cost.

Another object is to provide such a network which controls means for indicating tampering, an alarm and detects power failure.

Another object is to provide such a network which is adapted for operation in one manner during working hours and in another manner after closing hours when no people should be in the premises.

A further object is to provide such a network which can be tested periodically to determine whether or not the alarm system is functioning properly.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein.

Figure 1:
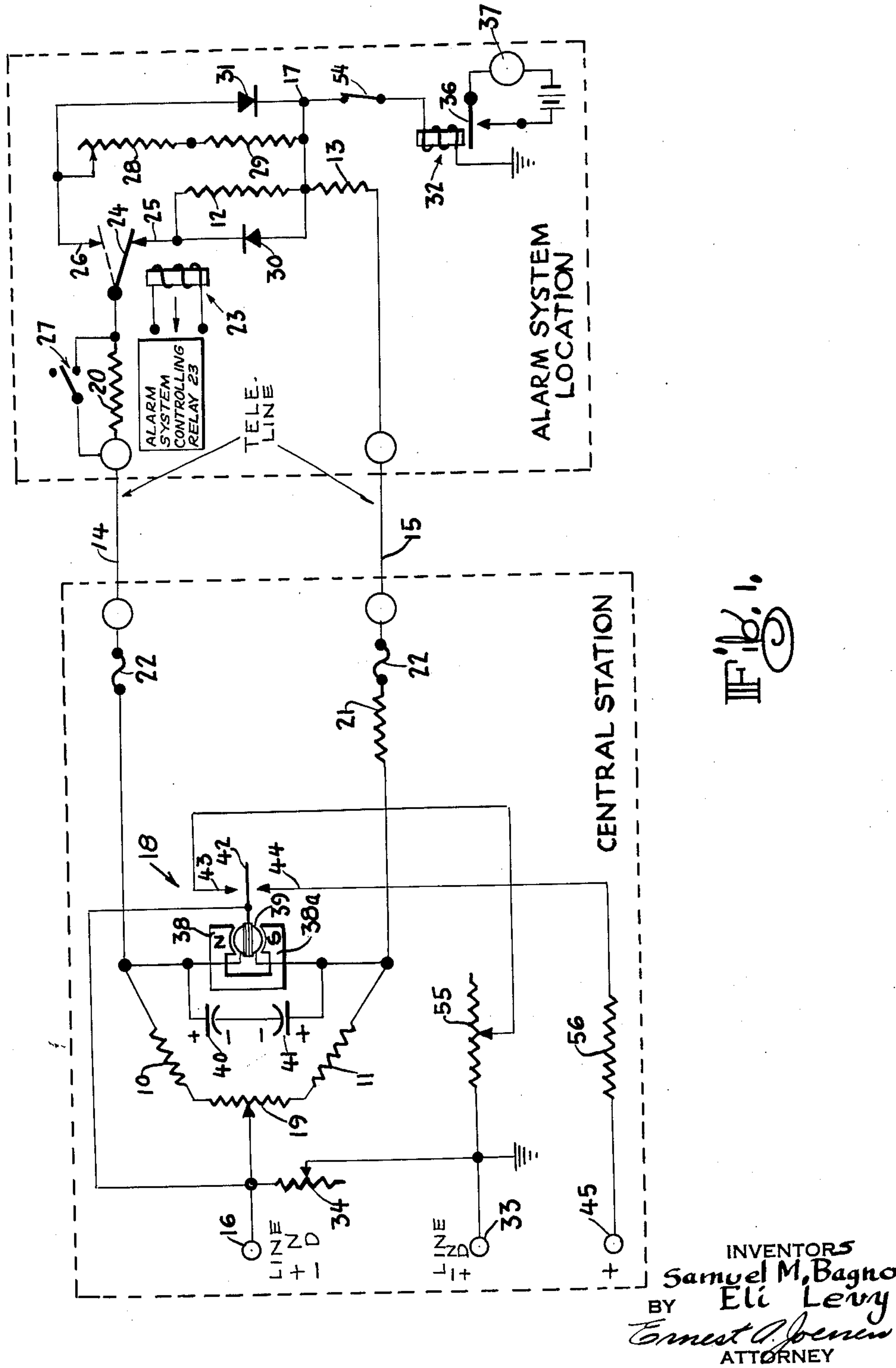
FIG. 1 is a circuit diagram of a network in accordance with the present invention.

Referring to the drawings in detail, the network shown generally comprises a balanced bridge including a first resistor 10 and a second resistor 11 located at a central station, a third resistor 12 and a fourth resistor 13 at the location of the alarm system and a transmission line, such as a telephone line having one side 14 connecting the first and third resistors in the manner described hereinafter and having another side 15 connecting the second and fourth resistors; means (FIG. 2) for supplying unidirectional current across the junction of the first and second resistors at terminal 16 and the junction of the third and fourth resistors at terminal 17; and an electromagnetic responsive device 18 connected across the sides of the line at the central station for controlling indicating means. As illustrated herein, the first and second resistors include a section 19 between them which is connected in voltage dividing relation to 16, whereby accurate balancing of the bridge is made feasible.

Resistors 20 and 21 having equal resistances are connected in the lines 14 and 15, respectively, with the resistor 20 located at the premises protected by the alarm system and the resistor 21 located at the central station, whereby tampering with the lines is made even more difficult. Also, a fuse 22 is connected in each of the lines 14 and 15, preferably at the central station.

Since the alarm system functions only during non-working hours or at night and not during working hours or the day, provision is made for detecting an alarm due to intrusion and tampering during the night and for detecting tampering during the day. In order to accomplish this, a relay 23 is provided which is normally energized when the alarm system is functioning during the night but which is deenergized when an intruder is detected or the alarm system is shut off during the daytime. The relay 23 or an equivalent set of contacts controls a switch member 24 connected to the line 14 which, during energization of the relay, engages a contact 25 to which the resistor 12 is connected and which, upon deenergization of the relay, engages a contact 26 for the purpose about to be described. Should the relay 23 drop out to cause the switch member 24 to disengage the contact 25 or either of the lines 14 and 15 be broken or short circuited to ground, the bridge will be unbalanced to cause the device 18 to operate an indicating circuit.

To further accomplish the foregoing, that is, to maintain the bridge in balance during the day when the relay 23 is deenergized and the switch member 24 engages the contact 26, a shunting switch 27 is provided for cutting the resistor 20 out of the line 14 during the daytime, and a fifth resistor 28 and a sixth resistor 29, in series, are connected between the contact 26 and the current supply at terminal 17. The combined resistance of resistors 28 and 29 is equal to the combined resistance of the resistors 20 and 12, whereby the bridge can be maintained in balance during the day and night. Preferably, the resistor 28 is variable to provide for accurate balancing of the bridge.

Day and night operation preferably are accompanied by reversing the polarity of the current supply and utilizing the change in polarity to enable the resistor 12 to be shunted out in the day and to enable the resistors 28 and 29 to be shunted out in the night so that a change in position of the switch member 24 either during the day or the night does not disturb the day or night bridge arrangement for which the network is set. This is accomplished by connecting a rectifier 30 across the resistor 12 in a manner to be conductive to the day polarity and non-conductive to the night polarity, and connecting a rectifier 31 across the resistors 28 and 29 in a manner to be non-conductive to the day polarity and conductive to the night polarity.

Such reversal of polarity is provided for by connecting terminal 17 to the ground at the alarm system location, preferably through a test relay 32 and a normally closed test switch 54 if day as well as night protection of a part of the premises is desired, connecting a terminal 33 to the ground at the central station, and reversing the polarity of the voltage applied to the terminals 16 and 33. For example, the polarity at the terminal 16 is positive during the night and is negative during the day and the polarity at the terminal 33 is negative during the night and is positive during the day. The voltage drop across the terminals 16 and 33 is controlled by a variable resistor 34 having a relatively high resistance.

Figure 2:
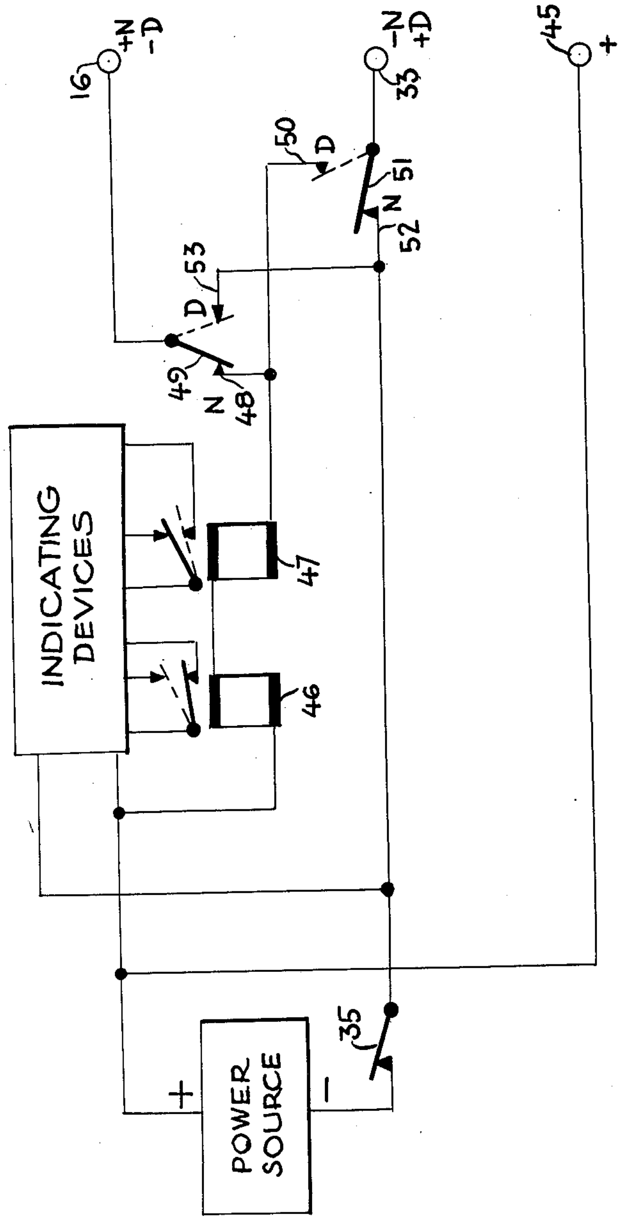
FIG. 2 is a simplified wiring diagram of an indicating circuit.

The test relay 32 is normally energized, but for purposes of testing the responsiveness of the alarm system to an intruder can be deenergized by opening a normally closed switch 35 between the power source and indicating device shown in FIG. 2 or by opening the switch 54. This causes a switch member 36 under the control of the test relay to close a test circuit which includes an electrically operated device 37 adapted to simulate an intruder and cause the alarm system to respond if it is in working order. Such a device is illustrated and described in United States Patent No. 2,615,970, October 28, 1952, Reissue 23,820, May 4, 1954.

As about to be described, the electromagnetic responsive device 18 controls the indicating circuit to detect intrusion and tampering during the night and to detect tampering during the day. To accomplish this, the device 18 comprises a permanent magnet having a pair of poles 38 and 38*a* and an armature coil 39 connected across the lines 14 and 15, a pair of electrolytic capacitors 40 and 41 connected in series negative to negative, across the lines 14 and 15 and in parallel with the coil 39, and a switch arm 42 carried by the armature coil 49 in electrical connection with the terminal 16 and normally biased in an intermediate position between contacts 43 and 44, respectively connected to the terminal 33 through a resistor 55 and to a terminal 45 connected to the positive side of the power source through a resistor 56.

The capacitors 40 and 41 have a relatively high capacitance and do not conduct direct current. However, should an attempt be made to insensitize the coil 39 and to immobilize the switch arm 42 by applying alternating current across the lines 14 and 15, the capacitors become conductive and short circuit the lines to blow the fuses 22, whereby the indicating means will respond to detect such tampering.

The indicating circuit shown in FIG. 2 includes a normally energized underload relay 46 and a normally deenergized overload relay 47 connected in series in a branch of the positive side of the power source. This branch, during the night, is connected to the terminal 16 through a contact 48 and a switch arm 49 and, during the day, is connected to the terminal 33 through a contact 50 and a switch arm 51. The negative side of the power source, during the night, is connected to the terminal 33 through a contact 52 and the switch arm 51 and, during the day, is connected to the terminal 16 through a contact 53 and the switch arm 49. The relays 46 and 47 control visual and audible indicating and alarm means in a conventional manner to provide a combination of signals.

During the night, as shown, the intruder detecting system is functioning so that the relay 23 is energized to hold the switch arm 24 in engagement with the contact 25; the switch 27 is open; the test switch 35 is closed; the switch arm 49 is in engagement with the contact 48; the switch arm 51 is in engagement with the contact 52; the terminal 16 is connected to the positive side of the power source and the terminal 17 is connected to the negative side of the power source through the relay 32, test switch 54 and ground to the terminal 33; and the bridge is balanced, whereby the switch arm 42 is in an intermediate position between the contacts 43 and 44.

The letters D and N as used herein designate switch positions and polarity during the day and night, respectively.

The alarm detecting system is tested under these conditions by momentarily opening the switch 35 which causes the relay 32 to drop out and causes the switch 36 to close the test circuit, whereby the intruder simulating device 37 is operated. Operation of the device 37 actuates the alarm system, when in working order, to cause the relay 23 to drop out. As the switch 35 is immediately closed again, the alarm detecting system, when in working order, remains in a state of alarm because the relay 23 will remain dropped out due to a time delay inherent in it whereby the switch arm 24 will engage the contact 26 to cut out the resistor 12 and short circuit the resistors 28 and 29 through the rectifier 31. When this occurs, the voltage between the terminals 16 and 45 decreases sufficiently due to the shunting effect of the resistor 56 when the arm 42 engages the contact 44 which effects an alarm indication. The alarm indication persists until the delay time has expired and the relay is again energized to cause the switch arm 24 to engage the contact 25 and cut in the resistor 12. Thus, the test signal consists by an alarm indication followed by a restoration indication.

Intrusion is detected in a similar manner, except that the switch 35 is closed, whereby, upon cutting out the resistors 12, 28 and 29, the voltage between the terminals 16 and 45 again decreases sufficiently to drop out the relay 46 which effects an alarm indication.

Tampering may be attempted in a number of ways. As already indicated, the connection of an alternating current source across the lines 14 and 15 causes the fuses 22 to be blown due to the short circuit established by the capacitors 40 and 41, whereby power fails across the terminals 16 and 33 and the relay 46 drops out to effect such an indication. Simultaneous cutting of both lines 14 and 15 would give a similar underload indication.

Any attempt to measure the resistance required to maintain the bridge in balance across the lines 14 and 15 at a point outside of the protected premises and the central station and to substitute resistance of such value is foiled because the resistor 20 would be cut out of the bridge to unbalance the bridge, whereby the device 18 would be operated to cause its switch arm 42 to engage the contact 43. This causes a short across the terminals 16 and 33 and cuts out the bridge resistance entirely, whereby the relay 47 is energized to effect an indication. Any other form of tampering which unbalances the bridge would be similarly detected, for example, cutting either of the lines 14 and 15.

During the day, the intruder detection system is shut off so that the relay 23 drops out and the switch arm 24 engages the contact 26 to cut out the resistor 12 and cut in the resistors 28 and 29, and the switch 27 is closed to shunt the resistor 20 to put the bridge in balance. Also, at the central station, the switch arm 49 is in engagement with the contact 53 and the switch arm 51 is in engagement with the contact 50, whereby the terminal 16 is connected to the negative side of the power source, the terminal 33 is connected to the positive side of the power source, and the terminal 17 is connected to positive through ground.

Any power failure is detected in the same manner as during the night. However, any form of tampering which unbalances the bridge causes the device 18 to be operated in a manner whereby the switch arm 42 engages either the contact 43 or the contact 44 to respectively establish an overload or underload condition in the indicating circuit in the manner previously described.

From the foregoing description, it will be seen that the present invention provides a network for monitoring alarm systems which is relatively simple, is practical, is reliable, and is economical to manufacture and install.

A very important advantage of utilizing a two wire transmission line connected in the bridge network is that both wires are subjected to the same conditions such as changes in temperature and the effects of induced voltages, whereby the change in condition of the wires is the same and the bridge network is maintained in balance. Telephone lines are preferred because they are available for communication between locations which may be a considerable distance apart and because they are cheaper to rent than to install private lines.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In a network for monitoring an alarm system, a balanced bridge including first and second resistors located at a central station, third and fourth resistors at the location of the alarm system, a two wire transmission line having one wire normally connecting said first and third resistors and having another wire connecting said second and fourth resistors, and a resistor in each wire of said line, one at the central station and one at the location of the alarm system; means for supplying current across the junction of said first and second resistors and the junction of said third and fourth resistors; an electro-responsive device connected across the wires of said line at the central station for controlling indicating means; manually operable shunting means connected across said resistor in said line at the location of the alarm system; a fifth resistor having one side connected to the junction of said third and fourth resistors and having a value equal to the sum of the values of said third resistor and said shuntable resistor; and a switch for disconnecting said first and third resistors and connecting said first resistor to the other side of said fifth resistor when the alarm system is inactive whereby said bridge is put in balance by rendering the shunting means effective.

2. In a network for monitoring an alarm system, a balanced bridge including first and second resistors located at a central station, third and fourth resistors at the location of the alarm system, a two wire transmission line having one wire normally connecting said first and third resistors and having another wire connecting said second and fourth resistors, and a resistor in each wire of said line, one at the central station and one at the location of the alarm system; means for supplying current across the junction of said first and second resistors and the junction of said third and fourth resistors; and an electro-responsive device connected across the wires of said line at the central station for controlling indicating means; manually operable shunting means connected across said resistor in said line at the location of the alarm system; a fifth resistor having one side connected to the junction of said third and fourth resistors and having a value equal to the sum of the values of said third resistor and said shuntable resistor; a switch for disconnecting said first and third resistors and connecting said first resistor to the other side of said fifth resistor; means conductive in one direction connected across said third resistor; means conductive in the opposite direction connected across said fifth resistor; and means for reversing the polarity of the current supply means.

3. In a network for monitoring an alarm system, a balanced bridge including first and second resistors located at a central station, third and fourth resistors at the location of the alarm system, a two wire transmission line having one wire normally connecting said first and third resistors and having the other wire connecting said second and fourth resistors, an indicating network at the central station including indicating means, means for supplying unidirectional current connected to said indicating network, first and second terminals, switch means connected to said indicating network and said first and second terminals for alternately and oppositely connecting said first and second terminals to the positive and negative wires of said current supply means, said first and second terminals being connected across the junction of said first and second resistors and the junction of said third and fourth resistors, and a third terminal connected to the positive wire of said current supply means; and an electro-responsive device connected across the wires of said line at the central station including a first contact electrically connected to said second terminal, a second contact electrically connected to said third terminal, and a third contact electrically connected to said first terminal adapted to selectively establish an electrical connection with said first and second contacts.

4. A network according to claim 3, wherein a variable resistor is connected to said first and second terminals, a variable resistor is in the connection between said first contact and said second terminal and the junction of said third and fourth resistors are connected to ground, and a resistor is in connection between said second contact and said third terminal.

5. In a network for monitoring an alarm system, a balanced bridge including first and second resistors located at a central station, third and fourth resistors at the location of the alarm system; a two wire transmission line having one wire normally connecting said first and third resistors and having the other wire connecting said second and fourth resistors; means for supplying unidirectional current; an indicating network at the central station including indicating means and an underload relay and an overload relay connected in series for operating said indicating means, said underload relay being connected to the positive side of said current supply means; first and second terminals; switch means for alternately and oppositely connecting said first and second terminals to the positive and negative sides of said current supply, said switch means including a first switch having a first contact connected to said overload relay, a second contact and a switch arm connected to said first terminal and including a second switch having a first contact connected to said second contact of said first switch and to the negative side of said current supply means and having a switch arm connected to said second terminal and having a second contact connected to said first contact of said first switch; said first and second terminals being connected across the junction of said first and second resistors and the junction of said third and fourth resistors; a third terminal connected to the positive side of said current supply means; and an electro-responsive device connected across the wires of said line at the central station including a first contact electrically connected to said second terminal, a second contact electrically connected to said third terminal, and a third contact electrically connected to said first terminal adapted to selectively establish an electrical connection with said first and second contacts.

6. A network according to claim 5, wherein a variable resistor is connected to said first and second terminals, a variable resistor is in the connection between said first contact and said second terminal and the junction of said third and fourth resistors are connected to ground, and a resistor is in connection between said second contact and said third terminal.

References Cited in the file of this patent

UNITED STATES PATENTS

| | | |
|---|---|---|
| 791,961 | Weatherby | June 6, 1905 |
| 2,605,329 | Hines | July 29, 1952 |
| 2,728,904 | Schafer | Dec. 27, 1955 |
| 2,742,634 | Bergen et al. | Apr. 17, 1956 |
| 2,745,089 | Levy | May 8, 1956 |